United States Patent [19]

Intveld

[11] 4,253,537
[45] Mar. 3, 1981

[54] INSTRUMENT PANEL COVER

[75] Inventor: Dwayne J. Intveld, Hazelgreen, Wis.

[73] Assignee: Deere & Company, Moline, Ill.

[21] Appl. No.: 963,917

[22] Filed: Nov. 27, 1978

[51] Int. Cl.³ ............................................. B60K 37/00
[52] U.S. Cl. ........................................ 180/90; 296/70
[58] Field of Search ............... 180/90; 296/24 R, 190, 296/191, 37.12, 37.8, 37.1, 70, 72, 73; 224/42.46 R, 273, 42.42 R, 42.45 R; 220/333, 329

[56] References Cited

U.S. PATENT DOCUMENTS

| 999,207 | 8/1911 | Clark | 220/333 |
|---|---|---|---|
| 2,545,959 | 3/1951 | King | 220/333 |
| 3,557,897 | 1/1971 | Conner et al. | 180/90 |
| 3,583,519 | 6/1971 | Meyer et al. | 180/90 |
| 3,841,431 | 10/1974 | Russey | 180/90 |
| 3,913,701 | 10/1975 | Williams | 296/70 |
| 4,112,718 | 9/1978 | Logsdon et al. | 180/90 |

*Primary Examiner*—John J. Love
*Assistant Examiner*—Ross Weaver

[57] ABSTRACT

An instrument panel cover is hingedly supported from opposite panel housing side walls by means of an unitary hinge rod having axially aligned out-turned ends respectively received in blind holes provided in the opposite side walls. The hinge rod is located and configured such as to be substantially hidden when the cover occupies an operative position blocking access to an instrument panel section and such as to guide the cover between its operative position and a stored position against a bottom housing wall extending orthogonally to the panel section at a lower edge of the latter. The cover is respectively releasably retained in its operative and stored positions by means of a key operated cam lock carried by the panel and having a lip engageable with an angled end of a locking rod fixed to the panel section, and by means of a clip provided with a resiliently expandable perforation for receiving the end of ball stud fixed to the lower housing wall.

13 Claims, 3 Drawing Figures

INSTRUMENT PANEL COVER

BACKGROUND OF THE INVENTION

The present invention relates to lockable instrument panel covers of a type mounted for movement between an operative position covering and protecting instruments from vandalism and a stored position permitting visual and/or manual access to instruments carried by the panel.

The use of lockable instrument panel covers on vehicles or equipment, which are often left unattended at unsecured work sites for extended periods of time, is commonplace. While designers of these prior art covers have attempted to create covers which are effective, inexpensive and ones which operators will find easy, convenient and acceptable to use, many of the covers suffer inadequacies relative to one or more of these design criteria.

For example, as concerns effectiveness, the mountings of many of the covers are such that the covers can easily be opened by using ordinary tools and/or pry bars and the like; and, as concerns operator acceptability, many of the covers are prone to rattling when placed in their stored positions resulting in their being removed by the operators.

SUMMARY OF THE INVENTION

According to the present invention, there is provided a novel instrument panel cover.

An object of the invention is to provide an instrument panel cover of simple construction mounted by means, which are entirely inaccessible when the cover is in its operative position and which function to guide the panel cover between its operative and stored positions.

A further object of the invention is to provide a panel cover including a key-operable lock cam and cooperating structure to effect a rugged lock assembly for releasably retaining the panel cover in its operative position.

Yet another object is to provide a panel cover including a clip perforated such as to form a resiliently expandable opening for receiving an end of a ball stud, which is fixed to a panel housing wall and operates to hold the cover in a stored position adjacent the housing wall.

These and other objects will become apparent from a reading of the ensuing description together with the appended drawing.

DESCRIPTION OF THE PREFERRED EMBODIMENT

Figure 1:
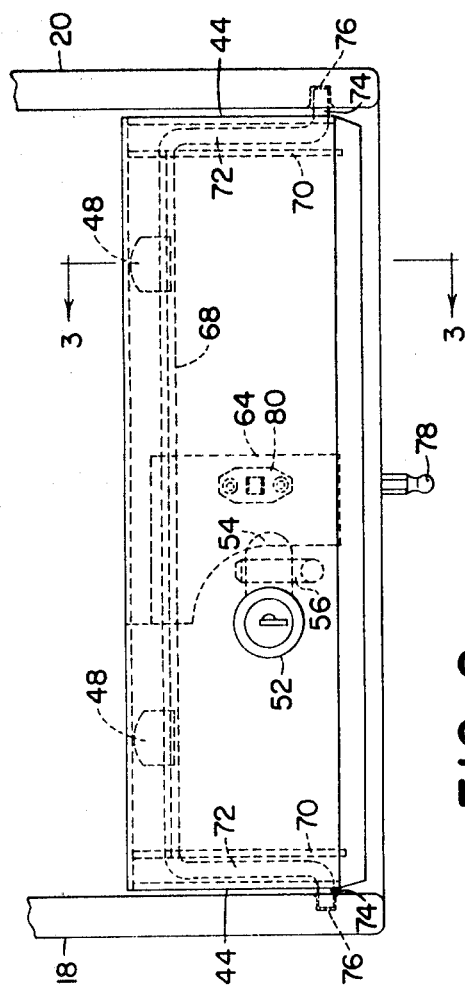
FIG. 1 is a perspective view showing a portion of a control console including an instrument panel and a cover therefor constructed in accordance with the present invention with the cover being shown in its stored position.

Referring now to FIG. 1, therein is shown a control console 10 as might be found on any of a variety of vehicles commonly used where it is necessary to protect instruments from vandalism. The console 10 includes an instrument panel housing 12 including a rectangular panel-receiving opening defined by forward and rearward walls 14 and 16, respectively, inclined downwardly and forwardly from respective upper ends thereof and joined by spaced, parallel, vertical left and right side walls 18 and 20. A downwardly and rearwardly inclined instrument panel 22 is mounted in the rectangular opening and includes an upper rectangular section 24, a lower rectangular section 26 disposed parallel to but stepped downwardly from the section 24 and a connecting section 28 joining the sections 24 and 26.

It is here noted that the upper panel section 24 carries a plurality of instruments 30 covered by relatively tough, virtually unbreakable, transparent synthetic resin material and, therefore, there is no need to further protect the instruments from vandalism.

However, the lower panel section 26 carries a pushpull light switch 32, a rotary control switch 34 and a park brake release handle 36 which all need to be secured to ensure that no unauthorized person turns on the lights or other electrical equipment or releases the vehicle brakes to thus permit the vehicle to roll.

Figure 2:
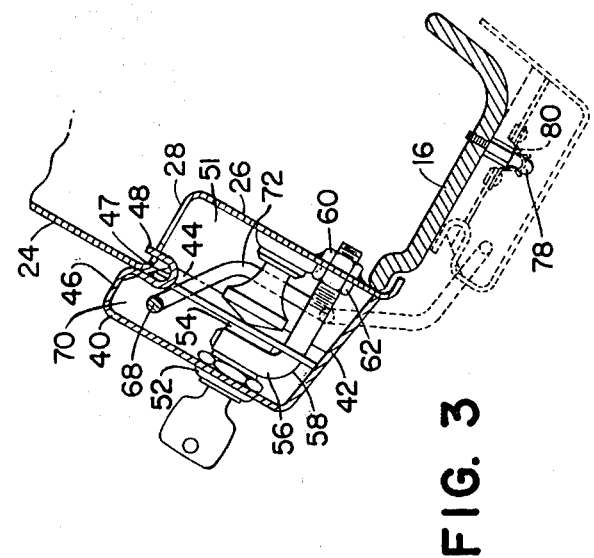
FIG. 2 is a view taken facing the top of the instrument panel illustrated in FIG. 1 and with the panel cover being shown in its operative position.

Accordingly, provided for releasably blocking access to the instruments carried by the lower panel section 26 is a panel cover 38. As viewed in its operative position illustrated in FIGS. 2 and 3, the panel cover 38 includes a main central portion of generally L-shaped cross-section comprised of an upper first rectangular section 40, disposed in spaced parallel relationship to the panel section 26 and to a lower margin of the upper panel section 24, and a lower second rectangular section 42, disposed generally orthogonally to and having a lower edge abuttingly engaged with a lower portion of the panel section 26. For a purpose hereinafter described, a pair of vertical skirts 44 are provided as continuations of the right and left ends of the first cover section 40. The cover also includes a skirt 46 which forms a continuation of the top end of the section 40 and includes a first portion which extends orthogonally to the section 40 and engages the lower margin of the panel section 24 and terminates in a reversely bent portion located entirely beneath the section 40 and defining a forwardly opening channel 47, the lower leg of which includes a pair of transversely spaced, forwardly projecting tabs 48.

Located in the connecting section 28 of the panel 22 are a pair of transversely spaced tab receptacles 50 in which the tabs 48 are respectively received. Thus it will be appreciated that when the cover 38 is in its operative position, it cooperates with the panel 22 and sidewalls 18 and 20 to define an enclosure 51 in which the instruments carried by the lower panel section 26 are located.

The cover 38 is releasably held in its operative position through means of a lock mechanism comprising a key-operable lock 52 carried by the cover 38 and including a locking tab 54 located beneath and here shown engaged with the underside of an upper angled end 56 of a locking rod 58 having a lower threaded end received in a nut 60 welded to an underside location of the panel section 26 and held in place by a jam nut 62. Thus it will be appreciated that the angled end 56 of the rod 58 may be adjusted for proper cooperation with the locking tab 54.

It is herenoted that a locking tab back-up plate 64 extends between and is welded to the skirt 46 and cover section 42 at a central location between the opposite ends of the cover 38. The plate 64 is disposed such that it gives additional support to the tab 54 and thereby increases the resistance the tab 54 would have to bending in the event that someone would attempt to pry off the cover 38, it being noted that the tabs 48 also resist such prying.

Figure 3:
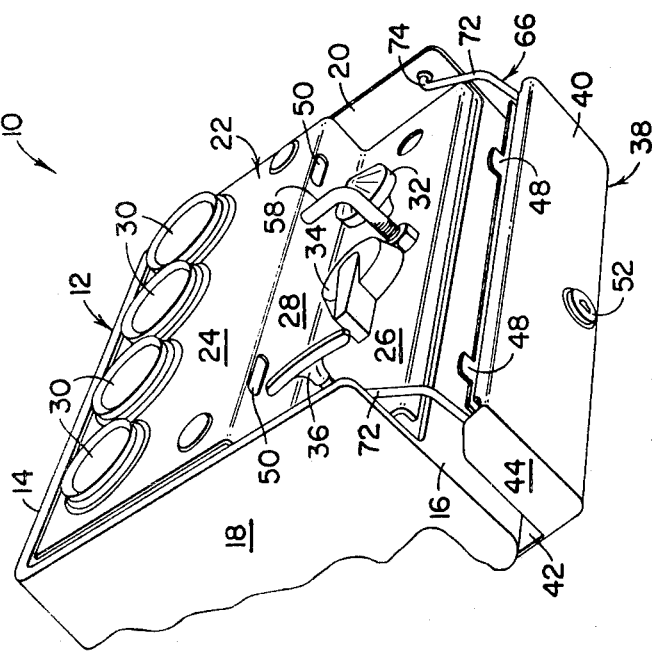
FIG. 3 is a vertical sectional view taken along the line 3—3 of FIG. 2, but additionally showing the stored position of the cover in dashed lines.

Provided for pivotally supporting and guiding the panel cover 38 for movement between its operative and inoperative positions, respectively illustrated in solid and dashed lines in FIG. 3, is a unitary hinge rod 66. The rod 66 includes a central straight portion 68 pivotally received in right and left mounting brackets 70 fixed to the underside of the cover section 40 adjacent opposite ends thereof. Dog leg-shaped portions 72 extend perpendicular to and are joined to the opposite ends of the central portion 68 and terminate in axially aligned, out-turned end portions 74 which are respectively received in blind bore receptacles 76 provided in the inner surfaces of the housing side walls 18 and 20. The dog-leg shaped portions 72 at the ends of the central portion 68 of the rod 66 are located to pass closely alongside the brackets 70 to thus restrict movement of the cover 38 along the rod portion 68. Also, it is to be noted that when the cover 38 is in its operative position the skirts 44 cooperate with the side walls 18 and 20 to prevent access to the hinge rod 66 so that a tool may not be used to disengage the rod 66 from the receptacles 76. In this regard it should be noted that one or both of the flanges 44 could be omitted if the height of one or both of the side walls were increased.

The cover 38 is releasably retained in its stored position by means of a ball stud 78 threadedly fixed to the lower housing wall 16. The lock tab back-up plate 64 of the cover 38 also serves as a support for a spring metal clip 80, which is perforated so as to form a resiliently expandable receptacle sized smaller than the outer end of the ball stud 78 but being expandable to receive the same so as to retain the cover in its stored position as shown in dashed lines in FIG. 3.

The operation of the invention is briefly as follows. Assuming the cover 38 to be in its operative position, shown in solid lines in FIG. 3, wherein it blocks access to the instruments carried by the lower panel section 26, it will be releasably retained in place through the coaction of the locking tab 54 and locking rod 58 of the key-operable lock mechanism and through the coaction of the cover tabs 48 and the tab receptacles 50. Further, it is to be noted that added integrity is given to the effectiveness of the lock mechanism due to the fact that the back-up plate 64 acts to support the free end of the locking tab 54.

To move the cover 38 from its operative to its stored position, the operator initially needs to insert a key in the lock 52 and rotate the tab 54 from beneath the angled end 56 of the locking rod 58. Once this is done, the tabs 48 can be released from the receptacles 50 by pivoting the cover 38 upwardly about the center portion 68 of the hinge rod 66. The cover 38 and rod 66 are then pivoted downwardly together about the pivot axis defined by the out-turned ends 74 of the rod. By virtue of the dog-leg shaped portions 72 of the rod 66, the cover 38 is guided to its stored position against the lower housing wall 16 with the receptacle of the clip 80 then being received on the outer end of the ball stud 78 so as to retain the cover 38 in its stored position.

It is of significance that the hinge rod 66 may be easily installed in the console housing 12 by merely inserting the left end (FIGS. 1 and 2) of the rod 66 in the left blind bore receptacle 76 and then by deflecting the rod 66 sufficiently to permit entry of its right end in the right blind bore receptacle. The rod 66 is made of such size and material that during installation it will not be flexed beyond its elastic limit and will therefore return to its unflexed state so as to securely engage the receptacles 76. This mounting of the hinge rod 66 contributes to the fact that the rod is completely hidden when the cover 38 is in its operative position.

I claim:

1. In a console including a panel housing including a pair of parallel, transversely spaced side walls joined by a rear wall, an inclined instrument panel supported by the housing and extending between respective inner surfaces of the side walls and having a lower end portion disposed adjacent the rear wall and a key-lockable instrument panel cover extending between the side walls and mounted for movement between an operative position covering at least a lower section of the panel and a stored position against the rear wall, an improved cover and mounting therefor, comprising: said inner surfaces of the side walls respectively having a pair of axially aligned blind bore receptacles located therein at locations adjacent to and above the lower edge of the panel; a generally U-shaped hinge rod defined by a central straight portion having dog-leg shaped end portions respectively joined to its opposite ends; said dog-leg shaped end portions being resiliently deflectable towards each other and respectively terminating in out-turned ends which are axially aligned with each other and respectively received in said blind bore receptacles; said central straight portion having the cover pivotally mounted thereon such that access to the hinge rod is blocked by cooperation of the panel cover and the side walls when the cover is in its operative position; and first and second locking means for respectively releasably securing the cover in its operative and stored positions.

2. A console as defined in claim 1 wherein the first locking means comprises a locking rod fixed to the lower portion of the panel for vertical adjustment relative thereto; said locking rod having an outer end extending generally parallel to the lower portion of the panel; and a key-operable lock carried by the panel cover and including a locking tab selectively rotatable for movement between a release position disposed free of the outer end of the locking rod and a lock position disposed just beneath the outer end of the locking rod.

3. A console as defined in claim 1, wherein the panel includes an upper section stepped upwardly from the lower section and joined thereto by a connecting section having a pair of transversely spaced elongate holes located therein; said cover, when in its closed position, having a pair of transversely spaced tabs respectively projecting into the pair of holes.

4. A console as defined in claim 2, wherein the panel includes an upper section stepped upwardly from the lower section and joined thereto by a connecting section having a pair of transversely spaced elongate holes located therein; said cover, when in its closed position, having a pair of transversely spaced tabs respectively projecting into the pair of holes.

5. The console defined in claim 2 wherein said first locking means further includes a locking tab back-up plate forming part of the cover and disposed in general parallelism to the lower panel section, when the cover is in its operative position, at a position just below a path traced by an outer end portion of the locking tab when the latter is swung between its lock and release positions.

6. The console defined in claim 5 wherein said second locking means includes a ball stud fixed in orthogonal outwardly projecting relationship to the rear wall and a spring metal clip fixed to the back-up plate and provided with a resiliently expandable receptacle sized and positioned to receive and resiliently expand to capture the ball stud when the cover is moved to its stored position.

7. The console defined in claim 3 wherein the cover includes a main central portion which is generally L-shaped in vertical cross-section and which, when considering the cover in its operative position, is comprised of a first section, disposed in spaced parallel realtionship the lower panel section and to the lower margin of the upper panel section, and a second section disposed generally orthogonally to and having a lower edge abuttingly engaged with the lower end portion of the lower panel section; and a forward skirt joining a forward end of the first section of the cover and abutting the lower margin of the upper section and including the pair of tabs.

8. The console defined in claim 1 wherein the cover includes a pair of transversely spaced vertical brackets disposed parallel to the side walls and respectively provided with axially aligned holes receiving the central straight portions of the hinge rod and thus pivotally mounting the cover on the rod.

9. A console for supporting instruments of a vehicle in upwardly and rearwardly facing relationship, comprising: said console having an upper portion of stepped cross-section defined by an upwardly and rearwardly facing instrument panel stepped between upper and lower ends thereof to form upper and lower parallel sections joined by an intermediate section and a rear housing wall extending generally orthogonally to the lower end of the panel; a pair of vertical side housing walls joined to the rear housing wall and respectively located at opposite sides of the panel; a panel cover shaped for cooperating with the side housing walls and the lower panel section, when the cover is in an operative position, to define an enclosure which is generally rectangular in cross-section; locking means for releasably securing the panel cover in its operative position; said panel cover having a stored position alongside said rear wall; detent means for releasably holding the cover in its stored position; a unitary hinge rod including a transverse central porition, on which the cover is pivotally mounted, and a pair of dog-leg shaped portions extending generally orthogonally to and being respectively joined to the opposite ends of the central portion; said dog-leg shaped portions respectively terminating in out-turned ends, which are axially aligned with each other; a pair of axially aligned blind bore receptacles respectively provided in inner surfaces of the side walls at locations adjacent the lower end of the panel; said out-turned ends being respectively received in the bores and said hinge rod being shaped and dimensioned such as to guide the cover between its operative and stored positions and being mounted such as to be located entirely within the enclosure when the cover is in its operative position.

10. The console defined in claim 9 wherein the intermediate section of the panel is provided with a pair of transversely spaced openings; and said panel cover having a pair of tabs respectively received in said openings.

11. The console defined in claim 9 wherein said locking means includes a threaded receptacle fixed to the lower section of the panel; a locking rod having a threaded end vertically adjustably received in the threaded receptacle and having an upper end disposed in spaced parallel relationship to the lower section of the panel; and a key-operable lock carried by the cover and including a locking tab which is selectively rotatable to a locking position between the upper end of the locking rod and the lower section of the panel when the cover is in its operative position, whereby the locking rod may be vertically adjusted to ensure contact between the locking rod and locking tab when the latter is in its locking position.

12. The console defined in claim 11, wherein the locking means also concludes a back-up plate forming part of the cover and located adjacent to the locking tab such as to support the tab from being deflected away from the upper end of the locking rod when the cover is in its operative position.

13. The console defined in claim 12 wherein the detent means includes a spring metal clip mounted on the back-up plate and provided with a resiliently expandable receptacle; and a detent member fixed to the rear wall and having an end shaped for being grippingly received within the receptacle when the cover is in its stored position.

* * * * *